UNITED STATES PATENT OFFICE.

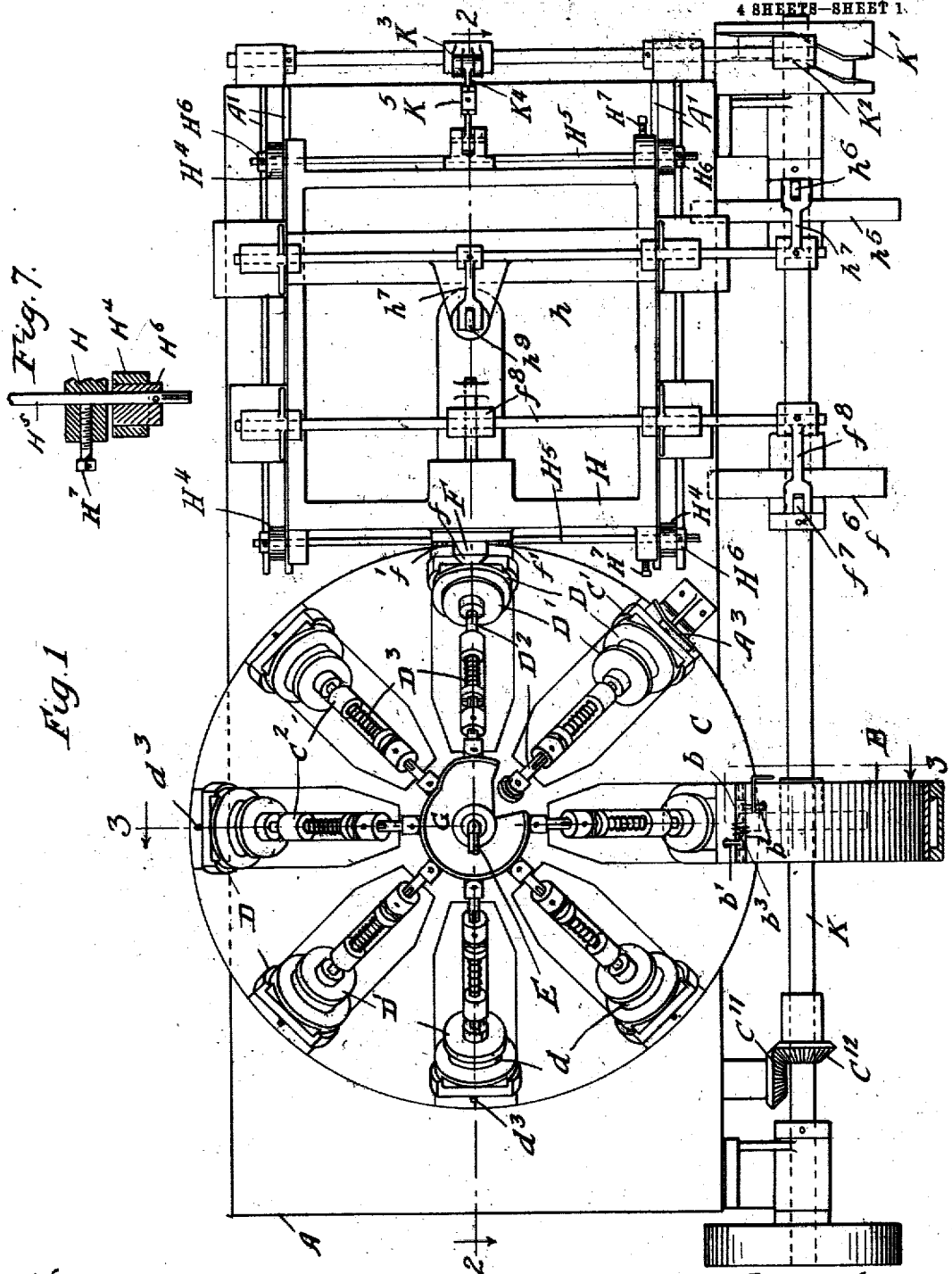

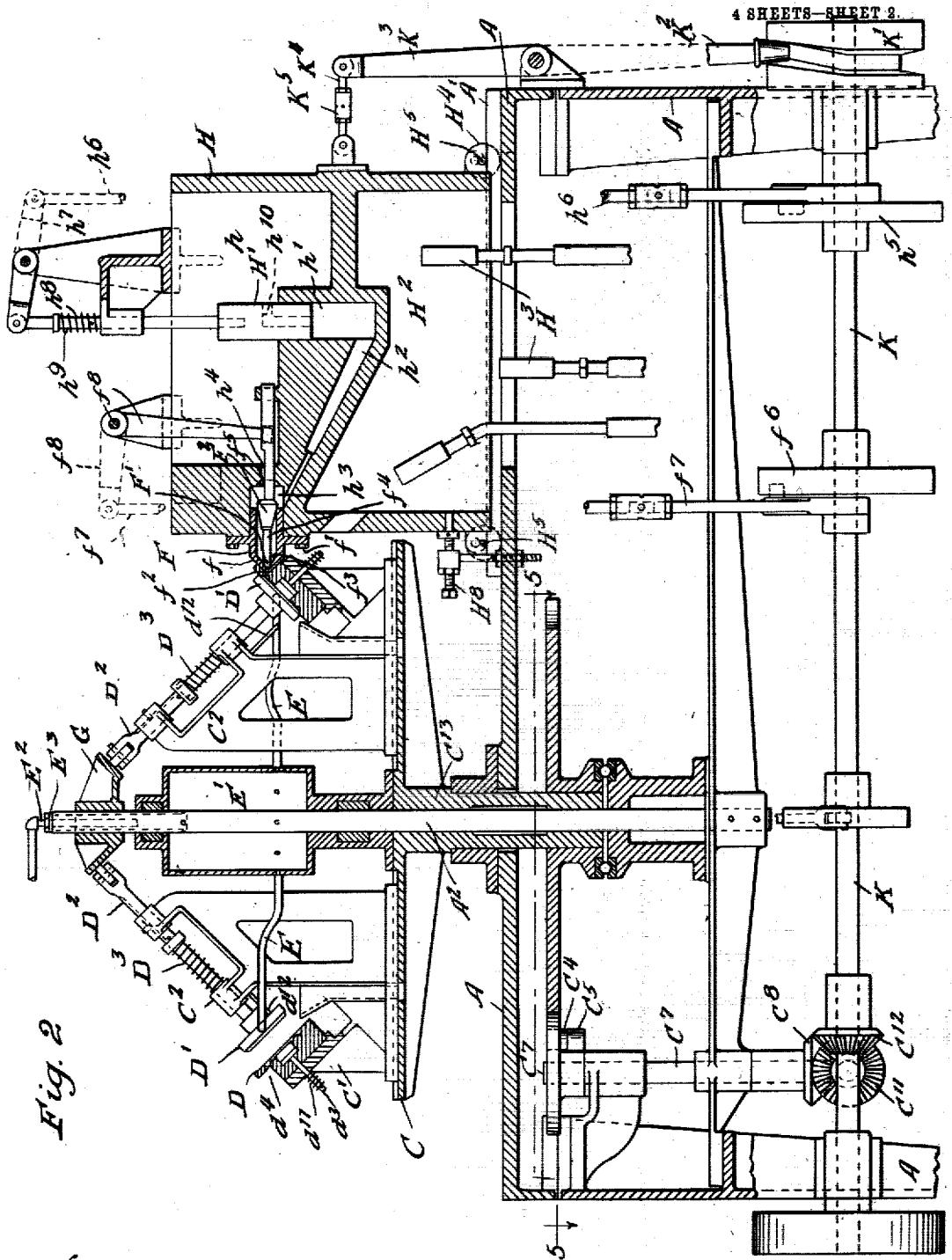

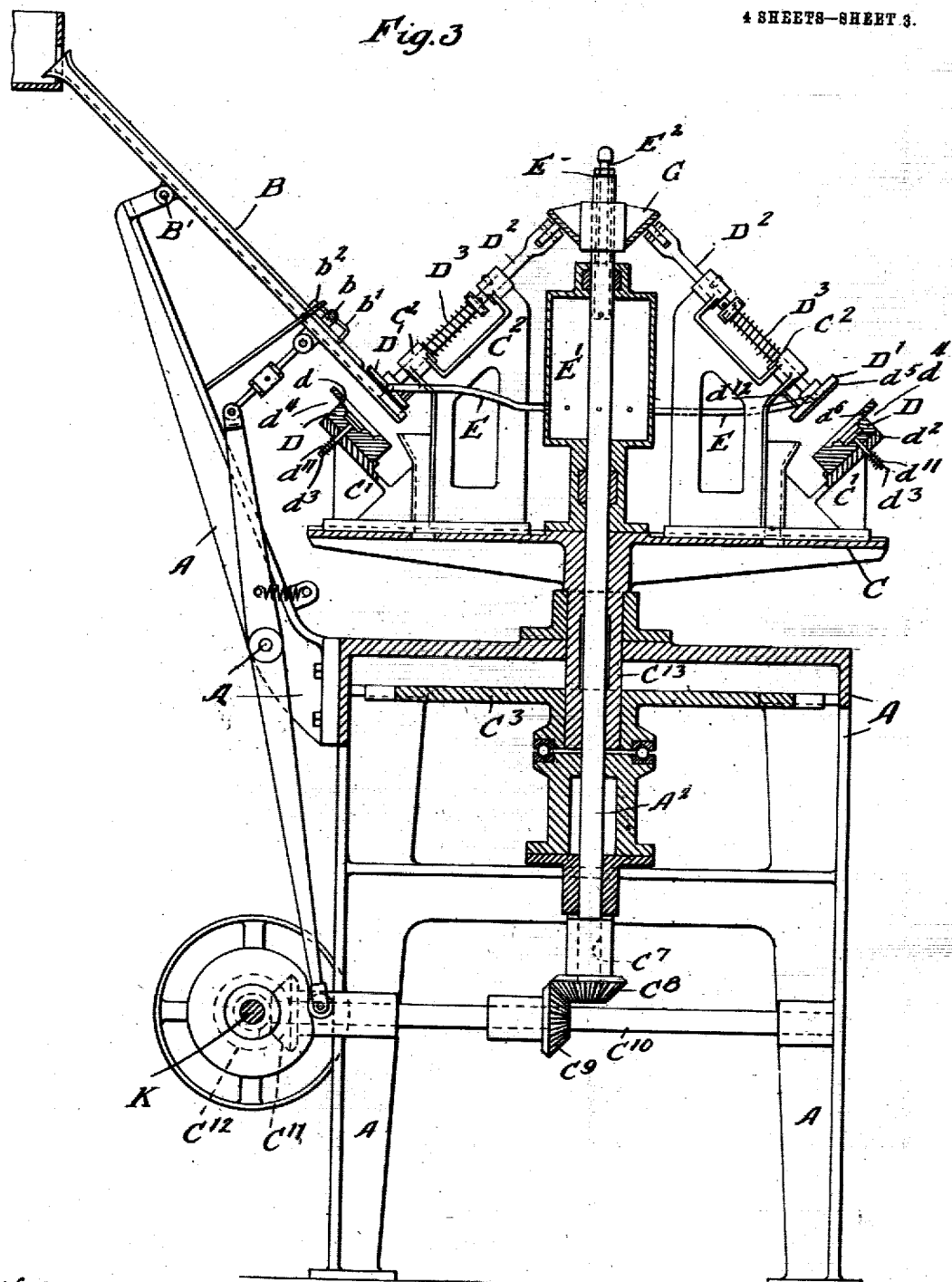

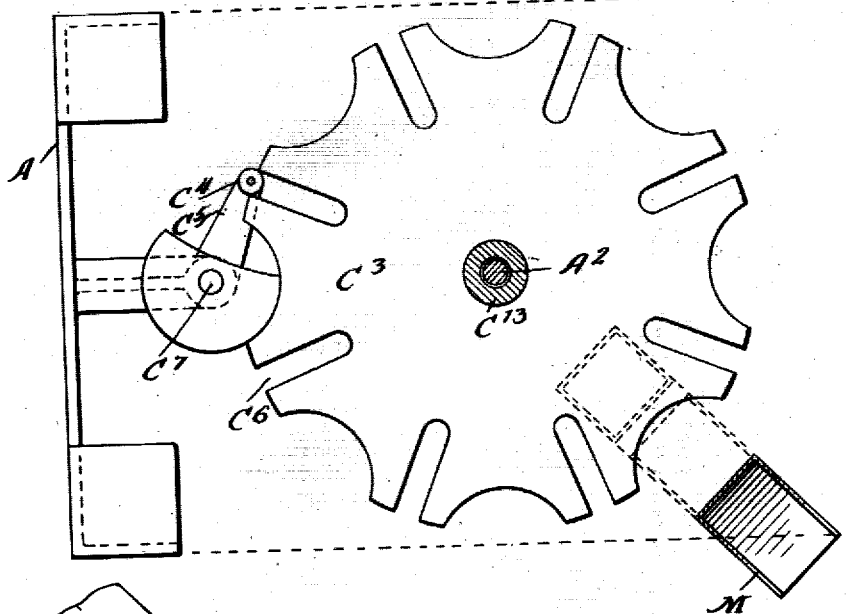
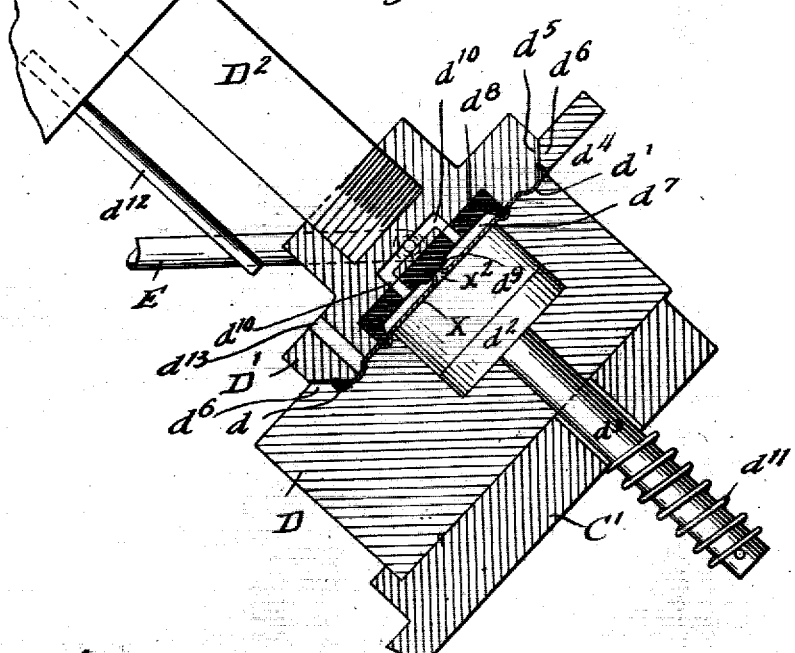

JOHN G. HODGSON, OF MAYWOOD, ILLINOIS, ASSIGNOR TO AMERICAN CAN COMPANY, OF NEW YORK, N. Y., A CORPORATION OF NEW JERSEY.

SOLDER-EDGED-CAP MACHINE.

No. 820,357.

Specification of Letters Patent.

Patented May 8, 1906.

Application filed November 20, 1905. Serial No. 288,150.

*To all whom it may concern:*

Be it known that I, JOHN G. HODGSON, a citizen of the United States, residing in Maywood, in the county of Cook and State of Illinois, have invented a new and useful Improvement in Solder-Edged-Cap Machines, of which the following is a specification.

My invention relates to machines for making what are known as "solder-edged-caps" for sheet-metal cans, the same being can-caps furnished at their rim or edge with an annulus of solder for soldering the caps to the cans after the cans are filled, and my invention relates more particularly to machines for casting an annulus of solder upon the rim of the can-cap on the outside face thereof.

The object of my invention is to provide an automatic machine of a simple, efficient, and durable construction by means of which the solder annulus or bead may be cast under pressure upon the rim of the can-caps and by which the work may be done rapidly, cheaply, and perfectly and without hand-labor.

My invention consists in the means I employ to practically accomplish this object or result—that is to say, it consists in combination with a feed device for the can-caps, of an intermittently-moving carrier, can-cap-holding molds mounted on the carrier to receive and hold the can-caps and leave the can-cap rims exposed to receive the molten solder, a molten-solder pot or vessel, a piston and cylinder therein for forcing the molten solder into the molds containing the can-caps and upon the outer rims thereof, a movable solder-discharge nozzle adapted to connect with each of the molds on the carrier in turn as the carrier rotates, a valve for opening and closing the discharge-nozzle, a valve-chamber and a choker-valve for closing the communication between the valve-chamber and the molten-solder chamber when the piston makes its downward stroke, and a heater for the molten-solder vessel.

My invention also consists, in combination with a can-cap-feed device, of a pair of can-cap-holding molds having an annular recess to expose the outer rim of the can-cap to the solder, of a molten-solder pot having a discharge-nozzle adapted to communicate with the can-cap-holding molds, and means for forcing the molten solder into the can-cap-holding molds and upon the rim of the can-cap, and means for automatically moving the discharge-nozzle to and from the can-cap-holding molds.

My invention also consists in the novel construction of parts and devices and in the novel combinations of parts and devices herein shown and described.

In the accompanying drawings, forming a part of this specification, Figure 1 is a plan view of an automatic machine for applying molten solder to can-caps embodying my invention. Fig. 2 is an elevation, partly in vertical section, on line 2 2 of Fig. 1. Fig. 3 is a detail section on line 3 3 of Fig. 1. Fig. 4 is an enlarged central vertical sectional view of one pair of the can-cap-holding molds. Fig. 5 is a horizontal section on line 5 5 of Fig. 2. Fig. 6 is a detail section of the completed can-head, and Fig. 7 is a horizontal section of one of the solder-pot-adjusting eccentrics and of the neighboring parts on a larger scale than Fig. 1.

In the drawings, A represents the frame of the machine.

B is the can-cap feeder, the same consisting, preferably, of an inclined chute or passage down which the can-caps may slide.

C is the carrier, the same consisting, preferably, of an intermittently-rotating wheel or turret.

D and D' are a pair of can-cap-holding molds, both preferably mounted on the carrier, a plurality or series of each being preferably employed. The lower molds D of each pair are removably secured to brackets C' on the carrier C, so that they may be removed and replaced with others of different sizes for operation upon can-caps of different diameters. One of the molds D D', preferably the lower one, is furnished with an annular recess $d$, forming an annular space to receive the annular bead or ring of solder $x$, which it is desired to cast upon and fusibly unite with the outer face of the rim or soldering flange $x'$ of the can-cap X. This lower mold D is also furnished with a can-cap seat or recess $d'$ to receive and fit the outside face of the can-cap X, and also with an ejector $d^2$, having a stem $d^3$ for ejecting the can-cap from its mold or holder D after the solder annulus or bead has been applied thereto or cast thereon. One of the molds D D' of each pair, preferably the lower one, is furnished with a nozzle-socket $d^4$, preferably of conical form, to receive the tapering end $f$ of the molten-solder-discharge nozzle F, and thus admit the molten solder to the annular recess of the mold and to the rim of the can-cap. One of the molds of each pair, preferably the upper one D′, is furnished with a rim $d^5$, which snugly fits the corresponding wall $d^6$ of the other mold D, and thus closes the annular solder-receiving recess of the molds and prevents, in connection with the can-cap, the escape of solder and confines the solder to the exposed portion of the can-cap rim adjacent to the solder-receiving annular recess $d'$ of the lower mold D. The upper mold D′ is preferably furnished with a recess $d^7$ and a rubber pad $d^8$, having a projection $d^9$ to close the vent-hole $x^2$ in the can-cap X, and thus cause the can-cap to adhere to the upper mold or holder D′ by suction, the holder D′ having passages $d^{10}$ therein connecting through a hose or flexible connection E with a vacuum or exhaust chamber E′, preferably on the carrier C.

The can-caps are automatically fed or delivered one by one to one of the molds D D′, preferably the upper one, by the feeder B, as the carrier brings each pair of molds in position for receiving the can-cap. The can-cap feeder B is preferably hinged to the frame at B′ and its lower end vibrated, as required to press the lowermost cap therein against the suction-pad of the upper mold D′, and thus automatically feed or deliver the cap thereto. I prefer to use air-suction instead of a magnet for causing the can-cap to adhere to the upper mold D′, and I also prefer to so combine the feeder with the molds that the can-caps are delivered thereby to the upper mold instead of to the lower one upon which gravity would cause the can-cap to remain in position until the upper mold closes. The upper mold D′ of each pair is opened and closed against the lower mold by its stem $D^2$ engaging a stationary cam G on the frame of the machine as the carrier rotates, a spring $D^3$ surrounding the stem $D^2$ and bearing at its lower end against the bracket $C^2$ on the carrier, serving to hold the upper mold normally retracted or open.

H is the molten-solder pot or vessel, the same having a solder-chamber $h$, a piston chamber or cylinder $h'$, a solder-duct $h^2$, leading from the lower end of the piston chamber or cylinder to the valve-chamber $h^3$, with which the solder pot or vessel is also provided. The discharge-nozzle F is preferably made in a separate piece from the solder pot or vessel and secured thereto by bolts $f'$. The tapering end $f$ on the nozzle F has a small discharge-orifice $f^2$, which is normally closed by the discharge-valve F′ engaging the valve-seat $f^3$. The valve-stem $f^4$ of the valve F′ is also furnished with a choker-valve $F^2$, which engages a valve-seat $f^5$ at the inner end of the valve-chamber $h^3$, which communicates by a passage $h^4$ with the molten solder in the pot or vessel H. The molten-solder pot or vessel H also has a piston or plunger H′, which operates to force the molten solder through the valve-chamber and discharge-nozzle and into the annular recess of the molds when the discharge-valve is open, and the choker-valve closes the return-passage between the valve-chamber and solder-chamber of the solder-pot. The solder pot or vessel H is also furnished with a heating-chamber $H^2$ for heating and keeping molten the solder in the solder-pot, valve-chamber, and discharge-nozzle. The heaters in the heating-chamber are preferably gas-jets $H^3$.

To operate the discharge-nozzle or move it into and out of contact with the mold, I preferably mount it rigidly instead of movably on the solder pot or vessel and mount the solder pot or vessel itself movably upon the frame of the machine, as this obviates the necessity for any movable or stuffing-box connection between the discharge-nozzle and solder-pot and somewhat simplifies the machine. The solder-pot is for this reason preferably provided with wheels or rollers $H^4$, which travel on ways A′ on the frame. The wheels or rollers $H^4$ are preferably journaled on eccentrics $H^6$, fixed on shafts $H^5$, which shafts may be adjusted by turning them more or less and then holding them by screws $H^7$ to vary the height of the discharge-nozzle as required to accommodate caps of different diameters. Adjusting-screws $H^8$ serve to adjust the position of the solder-pot horizontally in respect to the carrier. The solder-pot and discharge-nozzle are separated as required by means of a cam K′ on the driving-shaft K through the connecting-lever $K^2 K^3$ and link $K^4$, the link being provided with a turnbuckle $K^5$ for adjusting the throw or reciprocating movement of the solder-pot and discharge-nozzle.

The carrier C preferably has an upright hollow shaft $C^{13}$, surrounding the upright stationary stem $A^2$, which is connected to and forms a part of the frame, and the carrier is intermittently rotated as required to bring each pair of can-cap holding and receiving molds in turn into position for registry with the solder-discharge nozzle and with the can-cap feeder B by a Geneva stop mechanism $C^3$ $C^4 C^5$, the rotating arm $C^5$ carrying the pin $C^4$, which engages the slots $C^6$ of the disk $C^3$, the arm $C^5$ being on a shaft $C^7$, having gear $C^8$, meshing with gear $C^9$ on the shaft $C^{10}$, which has a gear $C^{11}$, meshing with a gear $C^{12}$ on the cam-shaft or driving-shaft K.

The piston or plunger H′ of the solder-pot is reciprocated as required by a cam $h^5$ on the cam-shaft K through the connecting-link $h^6$ and levers $h^7 h^7$. A spring $h^8$, surrounding the stem $h^9$ of the piston H′ serves to retract the piston. The piston H′, has a solder duct or passage $h^{10}$ therein to feed or admit solder to the piston chamber or cylinder $h'$. The valve-stem $f^4$ of the discharge-valve and choker-valve is reciprocated as required by a cam $f^6$ on the cam-shaft K, through the connecting-link $f^7$ and bell-crank lever $f^3$.

The feeder B may preferably be provided with a vibrating stop or escape device $b$, having forks or pins $b'$ $b^2$ to permit the passage of but one can at a time to the lower portion of the feeder or chute B. As the lower end of the chute B has a vibrating movement, this will serve to operate this escapement in connection with the spring $b^3$. This spring (seen in Fig. 1) is coiled around the axis of the vibrating escape device and tends to keep the lower forks $b'$ against the surface of the feeder B. $b^4$ is a fixed stop attached to the frame A and adapted to be engaged by the upper forks $b^2$ when the feeder B is moved upward, thereby bringing the upper forks into contact with the surface of the feeder, overcoming the resistance of the spring $b^3$ and moving the lower forks $b'$ out of contact with the feeder to release the lowermost cap.

The can-cap ejector $d^2$ or its stem $d^3$ is preferably furnished with a spring $d^{11}$ for holding it normally retracted, and the ejector of each mold is automatically operated as required to eject the cap from the mold into the discharge-cap chute M by a stationary cam $A^3$ on the frame of the machine, which is engaged by the ejector-stem as the carrier rotates.

Although the can-caps ordinarily will not stick to the upper mold when it is retracted by its spring $D^5$ to open the mold, I prefer to provide the bracket $C^2$ on the carrier with a cap-ejector stem or pin $d^{12}$, which projects through an opening $d^{13}$ in the upper mold $D'$, and thus engages the cap and ejects it from the mold $D'$ when said mold $D'$ is fully opened or retracted in case the cap should adhere thereto.

The vacuum-chamber $E'$ connects with a vacuum-pump or other exhaust device through the connecting-pipe $E^2$ in the stuffing box $E^3$, so that the vacuum-chamber exerts a constant suction through the hose.

I claim—

1. In a machine for applying or casting annular beads of solder upon the rims of can-caps, the combination with a can-cap feeder, of a movable carrier, a plurality of can-cap-holding molds mounted on the carrier, a molten-solder pot or vessel, a piston or plunger therein, a solder-discharge nozzle, a valve-chamber, a discharge-valve and a choker-valve, substantially as specified.

2. In a machine for applying or casting annular beads of solder upon the rims of can-caps, the combination with a can-cap feeder, of a movable carrier, a plurality of can-cap-holding molds mounted on the carrier, a molten-solder pot or vessel, a piston or plunger therein, a solder-discharge nozzle, a valve-chamber, a discharge-valve and a choker-valve, the molds on the carrier having can-cap ejectors, substantially as specified.

3. The combination with a pair of can-cap-holding molds, of a can-cap feeder, means for automatically opening and closing the molds, and means for automatically forcing molten solder into the mold upon the rim of the can-cap, substantially as specified.

4. The combination with a pair of can-cap-holding molds, means for automatically opening and closing the molds, a molten-solder pot or vessel, a discharge-nozzle and a piston or plunger for forcing molten solder from the solder-pot through the discharge-nozzle into the mold upon the rim of the can-cap, and a discharge-valve for the nozzle, substantially as specified.

5. The combination with a pair of can-cap-holding molds, means for automatically opening and closing the molds, a molten-solder pot or vessel, a discharge-nozzle and a piston or plunger for forcing molten solder from the solder-pot through the discharge-nozzle into the mold upon the rim of the can-cap, a discharge-valve for the nozzle, and a valve-chamber and a choker-valve, substantially as specified.

6. The combination with a pair of can-cap-holding molds, means for automatically opening and closing the molds, a molten-solder pot or vessel, a discharge-nozzle, a piston or plunger for forcing molten solder from the solder-pot through the discharge-nozzle into the mold upon the rim of the can-cap, and a can-cap feeder, substantially as specified.

7. The combination with a pair of can-cap-holding molds, means for automatically opening and closing the molds, a molten-solder pot or vessel, a discharge-nozzle and a piston or plunger for forcing molten solder from the solder-pot through the discharge-nozzle into the mold upon the rim of the can-cap, a discharge-valve for the nozzle, and a can-cap feeder, substantially as specified.

8. The combination with a pair of can-cap-holding molds, means for automatically opening and closing the molds, a molten-solder pot or vessel, a discharge-nozzle and a piston or plunger for forcing molten solder from the solder-pot through the discharge-nozzle into the mold upon the rim of the can-cap, a discharge-valve for the nozzle, a valve-chamber and a choker-valve, and a can-cap feeder, substantially as specified.

9. The combination with a pair of can-cap-holding molds, means for automatically opening and closing the molds, a molten-solder pot or vessel, a discharge-nozzle and a piston or plunger for forcing molten solder from the solder-pot through the discharge-nozzle into the mold upon the rim of the can-cap, one of said molds having a can-cap ejector, substantially as specified.

10. The combination with a can-cap feeder, of an intermittently-moving carrier, a plurality of can-cap-holding molds mounted on the carrier each having an annular recess to receive molten solder upon the rim of the can-cap thereon, and a molten-solder pot or vessel having a discharge-nozzle, substantially as specified.

11. The combination with a can-cap feeder, of an intermittently-moving carrier, a plurality of can-cap-holding molds mounted on the carrier each having an annular recess to receive molten solder upon the rim of the can-cap thereon, a molten-solder pot or vessel having a discharge-nozzle, and means for forcing molten solder through the discharge-nozzle into the mold upon the rim of the can-cap, substantially as specified.

12. The combination with a can-cap feeder, of an intermittently-moving carrier, a plurality of can-cap-holding molds mounted on the carrier, each having an annular recess to receive molten solder upon the rim of the can-cap thereon, a molten-solder pot or vessel having a discharge-nozzle, and a discharge-valve, substantially as specified.

13. The combination with a can-cap feeder, of an intermittently-moving carrier, a plurality of can-cap-holding molds mounted on the carrier each having an annular recess to receive molten solder upon the rim of the can-cap thereon, a molten-solder pot or vessel having a discharge-nozzle, a discharge-valve, a valve-chamber and a choker-valve, substantially as specified.

14. In a machine for applying or casting molten solder on can-caps, the combination of separable can-cap-holding molds, a movable carrier upon which they are mounted, and means for forcing molten solder into said molds upon the rim of the can-cap, substantially as specified.

15. In a machine for applying or casting molten solder on can-caps, the combination of separable can-cap-holding molds, a movable carrier upon which they are mounted, means for forcing the molten solder into said molds upon the rim of the can-cap, and a can-cap feeder, substantially as specified.

16. In a machine for applying molten solder to the rims of can-caps, the combination of a can-cap-holding mold having an annular recess to receive and confine under pressure the solder upon the rim of the can-cap, a movable solder-discharge nozzle, the solder being confined by the mold, the can-cap and the nozzle when the latter is moved into contact with the mold, and a solder-pot communicating with said nozzle, substantially as specified.

17. In a machine for applying molten solder to the rims of can-caps, the combination of a can-cap-holding mold having an annular recess to receive and confine under pressure the solder upon the rim of the can-cap, a movable solder-discharge nozzle, a solder-pot communicating with said nozzle, and a discharge-valve for said nozzle, the solder being confined by the mold, the can-cap and the nozzle when the latter is moved into contact with the mold, substantially as specified.

18. In a machine for applying molten solder to the rims of can-caps, the combination of the can-cap-holding mold having an annular recess to receive the solder upon the rim of the can-cap, a movable solder-discharge nozzle, a solder-pot communicating with said nozzle, a discharge-valve for said nozzle, a valve-chamber, and a choker-valve, substantially as specified.

19. In a machine for applying molten solder to the rims of can-caps, the combination of a can-cap-holding mold having an annular recess to receive and confine under pressure the solder upon the rim of the can-cap, a movable solder-discharge nozzle, a solder-pot communicating with said nozzle, and a piston, the solder being confined by the mold, can-cap and the nozzle when the latter is moved into contact with the mold, substantially as specified.

20. In a machine for applying molten solder to the rims of can-caps, the combination of a can-cap-holding mold having an annular recess to receive and confine under pressure the solder upon the rim of the can-cap, a movable solder-discharge nozzle, a solder-pot communicating with said nozzle, a discharge-valve for said nozzle, and a piston, the solder being confined by the mold, the can-cap and the nozzle when the latter is moved into contact with the mold, substantially as specified.

21. In a machine for applying molten solder to the rims of can-caps, the combination of a can-cap-holding mold having an annular recess to receive and confine under pressure the solder upon the rim of the can-cap, a movable solder-discharge nozzle, a solder-pot communicating with said nozzle, and a can-cap feeder, the solder being confined by the mold, the can-cap and the nozzle when the latter is moved into contact with the mold, substantially as specified.

22. In a machine for applying molten solder to can-caps, the combination with a can-cap-holding mold having an annular recess to receive and confine under pressure the solder upon the rim of the can-cap, of a can-cap feeder, means for forcing molten solder into the annular recess of the mold upon the rim of the can-cap, the solder being confined by the mold, the can-cap and the nozzle when the latter is moved into contact with the mold, substantially as specified.

23. In a machine for applying molten solder to can-caps, the combination with a can-cap-holding mold having an annular recess to receive the solder upon the rim of the can-cap, of a can-cap feeder, means for forcing molten solder into the annular recess of the mold upon the rim of the can-cap, substantially as specified.

24. In a machine for applying molten solder upon the rims of can-caps, the combination with a can-cap feeder, of an intermittently-moving carrier, a plurality of can-cap-holding molds on the carrier, and means for forcing molten solder into each mold in turn upon the rim of the can-cap, substantially as specified.

25. In a machine for applying molten solder upon the rims of can-caps, the combination with a can-cap feeder, of an intermittently-moving carrier, a plurality of can-cap-holding molds on the carrier, means for forcing molten solder into each mold in turn upon the rim of the can-cap, comprising a solder-pot and a solder-discharge valve communicating with said pot, substantially as specified.

26. In a machine for applying molten solder upon the rims of can-caps, the combination with a can-cap feeder, of an intermittently-moving carrier, a plurality of can-cap-holding molds on the carrier, means for forcing molten solder into each mold in turn upon the rim of each can-cap, comprising a solder-pot and a solder-discharge valve and nozzle communicating with said pot, the solder-pot being provided with a piston-chamber and piston, substantially as specified.

27. In a machine for applying molten solder upon the rims of can-caps, the combination with a can-cap feeder, of an intermittently-moving carrier, a plurality of can-cap-holding molds on the carrier, means for forcing molten solder into each mold in turn upon the rim of the can-cap, comprising a solder-pot and a solder-discharge nozzle communicating with said pot, the solder-pot being provided with a piston-chamber and piston, and a valve-chamber and choker-valve, substantially as specified.

28. In a machine for applying molten solder upon the rims of can-caps, the combination with a can-cap feeder, of an intermittently-moving carrier, a plurality of can-cap-holding molds on the carrier, means for forcing molten solder into each mold in turn upon the rim of the can-cap, comprising a solder-pot and a solder-discharge nozzle communicating with said pot, the solder-pot being provided with a piston-chamber and piston, and the discharge-nozzle having a discharge-valve, substantially as specified.

29. In a machine for applying molten solder upon the rims of can-caps, the combination with a can-cap feeder, of an intermittently-moving carrier, a plurality of can-cap-holding molds on the carrier, means for forcing molten solder into each mold in turn upon the rim of the can-cap, comprising a solder-pot and a solder-discharge nozzle communicating with said pot, the solder-pot being provided with a piston-chamber and piston, a valve-chamber and choker-valve, and the discharge-nozzle having a discharge-valve, substantially as specified.

30. In a machine for applying molten solder to can-caps, the combination with a plurality of can-cap holders, a carrier upon which they are mounted, a can-cap feeder, and means for applying molten solder upon the rims of the can-caps in the holders, substantially as specified.

31. In a machine for applying molten solder to can-caps, the combination with a plurality of can-cap holders, a carrier upon which they are mounted, a can-cap feeder, and means for applying molten solder under pressure upon the rims of the can-caps in the holders, substantially as specified.

32. In a machine for applying molten solder to can-caps, the combination with a plurality of can-cap holders, of a carrier upon which said holders are mounted, and means for applying molten solder under pressure upon the rims of the can-caps in the holders, said holders operating in conjunction with the can-caps to confine the solder under pressure on the caps, substantially as specified.

33. The combination with a pair of can-cap-holding molds, devices for automatically opening and closing the molds, a molten-solder pot or vessel, a discharge-nozzle for the molten solder, means for forcing molten solder from the solder-pot through the discharge-nozzle into the molds upon the rim of the can-cap, and a can-cap feeder for delivering caps successively between the two molds of said pair of molds, substantially as specified.

34. In an apparatus for applying molten solder upon the rims of can-caps, the combination with a plurality of can-cap holders, of a carrier upon which they are mounted, and a reciprocating solder-pot and solder-discharge nozzle, substantially as specified.

35. In an apparatus for applying molten solder upon the rims of can-caps, the combination with a plurality of can-cap holders, of a carrier upon which they are mounted, and a reciprocating solder-pot and solder-discharge nozzle, said solder-pot having a piston, substantially as specified.

36. In an apparatus for applying molten solder upon the rims of can-caps, the combination with a plurality of can-cap holders, of a carrier upon which they are mounted, a reciprocating solder-pot and solder-discharge nozzle having a piston and provided with a discharge-valve, substantially as specified.

37. In an apparatus for applying molten solder upon the rims of can-caps, the combination with a plurality of can-cap holders, of a carrier upon which they are mounted, a reciprocating solder-pot and solder-discharge nozzle, said solder-pot having a piston, and said discharge-nozzle being provided with a discharge-valve, and a valve-chamber and a choker-valve, substantially as specified.

38. In a machine for applying molten solder upon the rims of can-caps, the combination with a carrier, a plurality of lower molds D mounted on the carrier, a plurality of opening and closing upper molds mounted on the carrier, and a can-cap feeder, substantially as specified.

39. In a machine for applying molten solder upon the rims of can-caps, the combination with a carrier, a plurality of lower molds D mounted on the carrier, a plurality of opening and closing upper molds mounted on the carrier, a can-cap-feed chute, and means for vibrating the lower end of the feed-chute to press the caps against the lower face of the upper mold, substantially as specified.

40. In a machine for applying molten solder upon the rims of can-caps, the combination with a carrier, a plurality of lower molds D mounted on the carrier, a plurality of opening and closing upper molds mounted on the carrier, a can-cap-feed chute, and means for vibrating the lower end of the feed-chute to press the caps against the lower face of the upper mold, the upper mold of each pair of molds having means for causing the can-cap to adhere thereto, substantially as specified.

41. In a machine for applying molten solder upon the rims of can-caps, the combination with a carrier, a plurality of lower molds D mounted on the carrier, a plurality of opening and closing upper mlods mounted on the carrier, a can-cap-feed chute, and means for vibrating the lower end of the feed-chute to press the caps against the lower face of the upper mold, the upper mold of each pair of molds having a suction device for causing the can-cap to adhere thereto, substantially as specified.

42. In a machine for applying molten solder to can-caps, the combination with a pair of opening and closing can-cap-holding molds, of means for automatically feeding or delivering can-caps between the molds, and means for automatically applying molten solder to the can-caps in the molds, substantially as specified.

43. In a machine for applying molten solder to sheet-metal articles, the combination with a pair of opening and closing molds for holding the article and exposing a portion thereof to the molten solder, and means for automatically applying molten solder upon the article in the molds, substantially as specified.

JOHN G. HODGSON.

Witnesses:
  H. M. MUNDAY,
  WILLIAM A. GEIGER.